(12) United States Patent
Sakashita et al.

(10) Patent No.: US 12,491,573 B2
(45) Date of Patent: Dec. 9, 2025

(54) WELDING APPARATUS AND METHOD

(71) Applicant: MITSUBISHI HEAVY INDUSTRIES, LTD., Tokyo (JP)

(72) Inventors: Hideshi Sakashita, Tokyo (JP); Tatsuya Hashimoto, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 992 days.

(21) Appl. No.: 17/629,514

(22) PCT Filed: Mar. 6, 2020

(86) PCT No.: PCT/JP2020/009577
§ 371 (c)(1),
(2) Date: Jan. 24, 2022

(87) PCT Pub. No.: WO2021/038927
PCT Pub. Date: Mar. 4, 2021

(65) Prior Publication Data
US 2022/0266369 A1    Aug. 25, 2022

(30) Foreign Application Priority Data

Aug. 29, 2019  (JP) ................... 2019-156692

(51) Int. Cl.
*B23K 9/00*     (2006.01)
*B23K 37/02*    (2006.01)
(52) U.S. Cl.
CPC ........ *B23K 9/0052* (2013.01); *B23K 37/0229* (2013.01)

(58) Field of Classification Search
CPC .............. B23K 9/0052; B23K 37/0229; B23K 26/082; B23K 26/32; B23K 26/24; B23K 26/28; B23K 26/703; B23K 26/22; B23K 26/0622; B23K 2101/18; B23K 2101/006; B23K 26/323; B23K 26/044; B23K 2203/04; B23K 26/26; B23K 26/244; B23K 26/14; B23K 31/125; B23K 26/20;
(Continued)

(56) References Cited

U.S. PATENT DOCUMENTS

2013/0048620 A1    2/2013   Oh et al.

FOREIGN PATENT DOCUMENTS

EP    1 762 328 B1    4/2008
EP    2 484 479 A1    8/2012
(Continued)

OTHER PUBLICATIONS

English Translation of Written Opinion dated May 12, 2020, issued in counterpart Application No. PCT/JP2020/009577. (4 pages).
(Continued)

*Primary Examiner* — Phuong T Nguyen
(74) *Attorney, Agent, or Firm* — WHDA, LLP (57) ABSTRACT

Provided are a welding apparatus and a method, including a welding torch, a wire nozzle, a support stand that supports the welding torch and the wire nozzle with a predetermined distance therebetween, and a first support mechanism that supports the support stand so that the support stand is rotatable around a first support axis that is along a direction in which the welding torch and the wire nozzle are arranged.

9 Claims, 8 Drawing Sheets

(58) Field of Classification Search
CPC ............ B23K 26/0066; B23K 26/0626; B23K 26/073; B23K 26/38; B23K 26/0619; B23K 26/0624; B23K 26/53; B23K 26/0006; B23K 26/0676; B23K 26/0861; B23K 2103/56; B23K 2101/40
USPC .... 219/125.11, 121.63, 121.64, 121.72, 136, 219/119
See application file for complete search history.

(56) References Cited

FOREIGN PATENT DOCUMENTS

| EP | 2 177 301 B1 | | 10/2013 | |
|----|--------------|---|---------|---|
| JP | H05-177355 A | | 7/1993 | |
| JP | H05177355 | * | 7/1993 | ............. B23K 9/133 |
| JP | 2013-525117 A | | 6/2013 | |
| JP | 5582790 B2 | | 9/2014 | |
| KR | 101429604 B1 | | 8/2014 | |

OTHER PUBLICATIONS

Extended (Supplementary) European Search Report dated Aug. 5, 2022, issued in counterpart EP application No. 20858021.7. (6 pages).

* cited by examiner

WELDING APPARATUS AND METHOD

FIELD

The present disclosure relates to a welding apparatus and a welding method for welding to a narrow part.

BACKGROUND

For example, a pressurized water reactor uses light water as a reactor coolant and a neutron moderator to make high-temperature, high-pressure water that does not boil over the entire core, and sends the high-temperature, high-pressure water to a steam generator so as to produce steam through heat exchange.

In the pressurized water reactor, a reactor core is provided inside of a reactor vessel, and the core includes a large number of fuel rods. The reactor vessel includes a control rod driving unit at an upper part thereof, and the control rod driving unit can control the reactor power by inserting control rods into the many fuel rods. The control rod driving unit is disposed at an upper part of a reactor vessel lid, control rod cluster drive shafts are guided by nozzles fixed to the reactor vessel lid and inserted into the reactor vessel, and tip ends of the control rod cluster drive shafts are connected to the control rods.

The reactor vessel lid includes the plurality of nozzles fixed together thereto by welding. Examples of a technique for fixing the nozzles to the reactor vessel lid include a technique described in Patent Literature 1 below, for example. The welding apparatus described in Patent Literature 1 includes a welding electrode, a welding wire, and a wire nozzle reversing mechanism, and allows the wire nozzle reversing mechanism to change a supply position of the welding wire to the welding electrode that moves along a weld portion.

CITATION LIST

Patent Literature

Patent Literature 1: Japanese Patent No. 5582790

SUMMARY

Technical Problem

In the above-described conventional welding apparatus, when the nozzle is fixed to the reactor vessel lid, the welding apparatus goes half around the nozzle clockwise for welding from a predetermined position and then goes half around the nozzle counterclockwise for welding from the predetermined position, thereby welding the entire circumference of the outer circumference of the nozzle. Since it is necessary to move the welding wire ahead of the welding electrode, a wire nozzle reversing mechanism is provided. As a result, the configuration of the welding apparatus becomes more complicated and increases in size. The reactor vessel lid needs to fix the nozzles thereto at predetermined intervals, and a space in which the welding apparatus can move is narrow. Accordingly, it is desirable to downsize the welding apparatus.

The present disclosure is intended to solve the above-described problem, and an object of the present disclosure is to provide a welding apparatus and a method capable of achieving miniaturization of the apparatus.

Solution to Problem

In order to achieve the above object, a welding apparatus according to the present disclosure includes a welding torch; a wire nozzle; a support stand that supports the welding torch and the wire nozzle with a predetermined interval therebetween; and a first support mechanism that supports the support stand so that the support stand is rotatable around a first support axis that is along a direction in which the welding torch and the wire nozzle are arranged.

Further, a welding method according to the present disclosure is for a welding apparatus including: a welding torch, a wire nozzle, and a support stand that supports the welding torch and the wire nozzle. The welding method includes the steps of: performing welding by rotating the support stand by a predetermined angle from a reference position to one side around the first support axis along a direction in which the welding torch and the wire nozzle are arranged; and performing welding by rotating the support stand by a predetermined angle from the reference position to the other side around the first support axis.

Advantageous Effects of Invention

The welding apparatus and the method of the present disclosure are capable of achieving the miniaturization of the apparatus.

DESCRIPTION OF EMBODIMENTS

The following describes in detail a suitable embodiment of the present disclosure with reference to the drawings. The present disclosure is not limited by the present embodiment, and when there are multiple embodiments, the embodiments include an embodiment configured by combining any of the embodiments. Components in the embodiments include those that can be easily envisioned by those skilled in the art, those that are substantially identical, and those that are within what is called a scope of equality.

[Pressurized Water Reactor]

Figure 9:
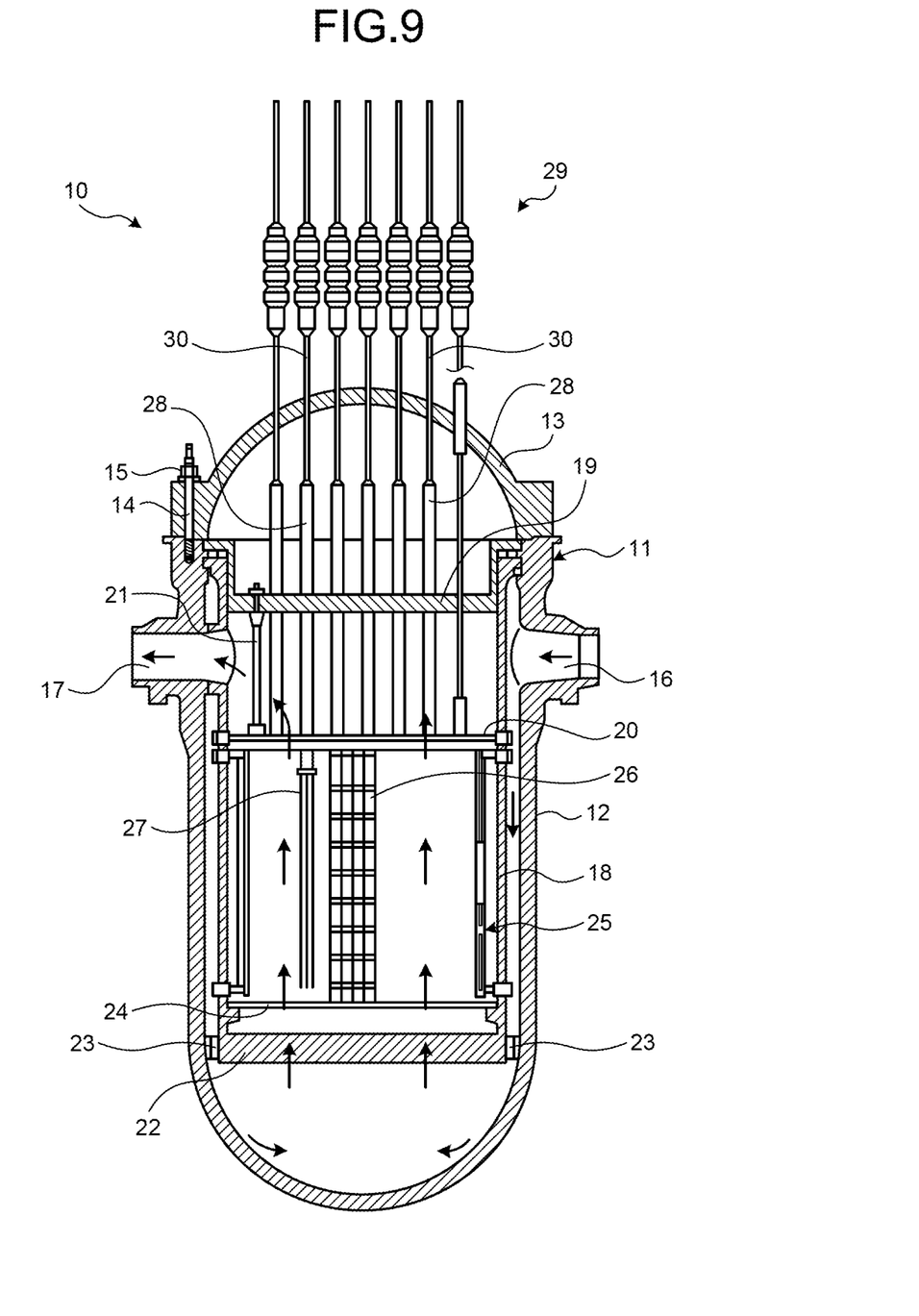
FIG. 9 is a longitudinal sectional view illustrating a pressurized water reactor.

FIG. 9 is a longitudinal sectional view illustrating a pressurized water reactor.

Although not illustrated in the drawings, a nuclear power plant has a nuclear reactor and a steam generator that are disposed in a reactor containment vessel, and a steam turbine power generation system. A nuclear reactor of the present embodiment is a pressurized water reactor.

As illustrated in FIG. 9, in a pressurized water reactor 10, the reactor vessel 11 includes, so as to be able to have a reactor internal structure inserted thereinside, a reactor vessel body 12 and a reactor vessel lid 13 mounted on an upper part of the reactor vessel body 12, the reactor vessel lid 13 being fixed to the reactor vessel body 12 with a plurality of stud bolts 14 and nuts 15, in an openable manner.

The reactor vessel body 12 has a cylindrical shape having an upper part that is open and a lower part that has a hemispherical shape and is closed, and on the upper part, an inlet nozzle 16 for supplying light water serving as primary coolant and an outlet nozzle 17 for discharging the light water are formed. The reactor vessel body 12 has a core barrel 18 disposed thereinside, and the core barrel 18 has an upper part that is supported by the inner wall of the reactor vessel body 12. The reactor vessel body 12 has an upper core support plate 19 disposed thereinside, and the upper core support plate 19 has a top that is supported by the upper part of the core barrel 18. An upper core plate 20 is suspended from the upper core support plate 19 and supported with a plurality of core support rods 21.

The core barrel 18 supports a lower core support plate 22 on the lower part thereof, and the lower core support plate 22 has an outer circumference positioned on an inner wall of the reactor vessel body 12 and supported by positioning members 23. The reactor core barrel 18 supports a lower core plate 24 in the lower part thereof. A reactor core 25 includes a large number of fuel assemblies 26, and has a large number of control rods 27 disposed inside the reactor core 25, and the control rods 27 can be inserted into the fuel assemblies 26. The upper core support plate 19 has a large number of control rod cluster guide tubes 28 fixed thereto, and the control rods 27 can be inserted into the respective control rod cluster guide tubes 28. The reactor vessel lid 13 has a hemispherical shape, on which a control rod driving unit 29 is disposed, a plurality of control rod cluster drive shafts 30 are inserted into the control rod cluster guide tubes 28, and the control rods 27 are connected to respective lower ends of the control rod cluster drive shafts 30. The control rod driving unit 29 controls reactor power by pulling in and out each of the control rods 27 with respect to the reactor core 25.

Welding Apparatus

Figure 1:
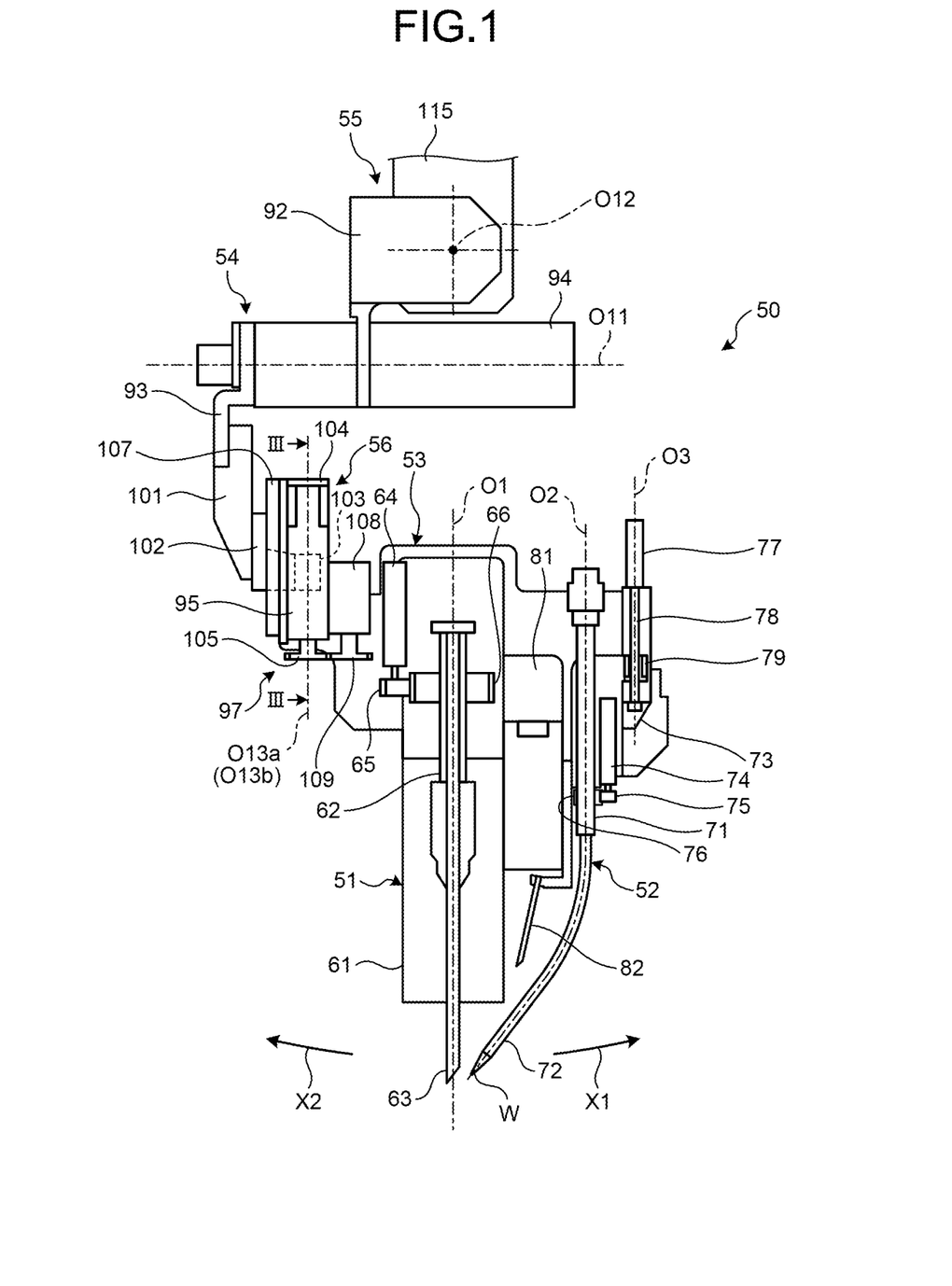
FIG. 1 is a front view illustrating welding apparatus of the present embodiment.
Figure 2:
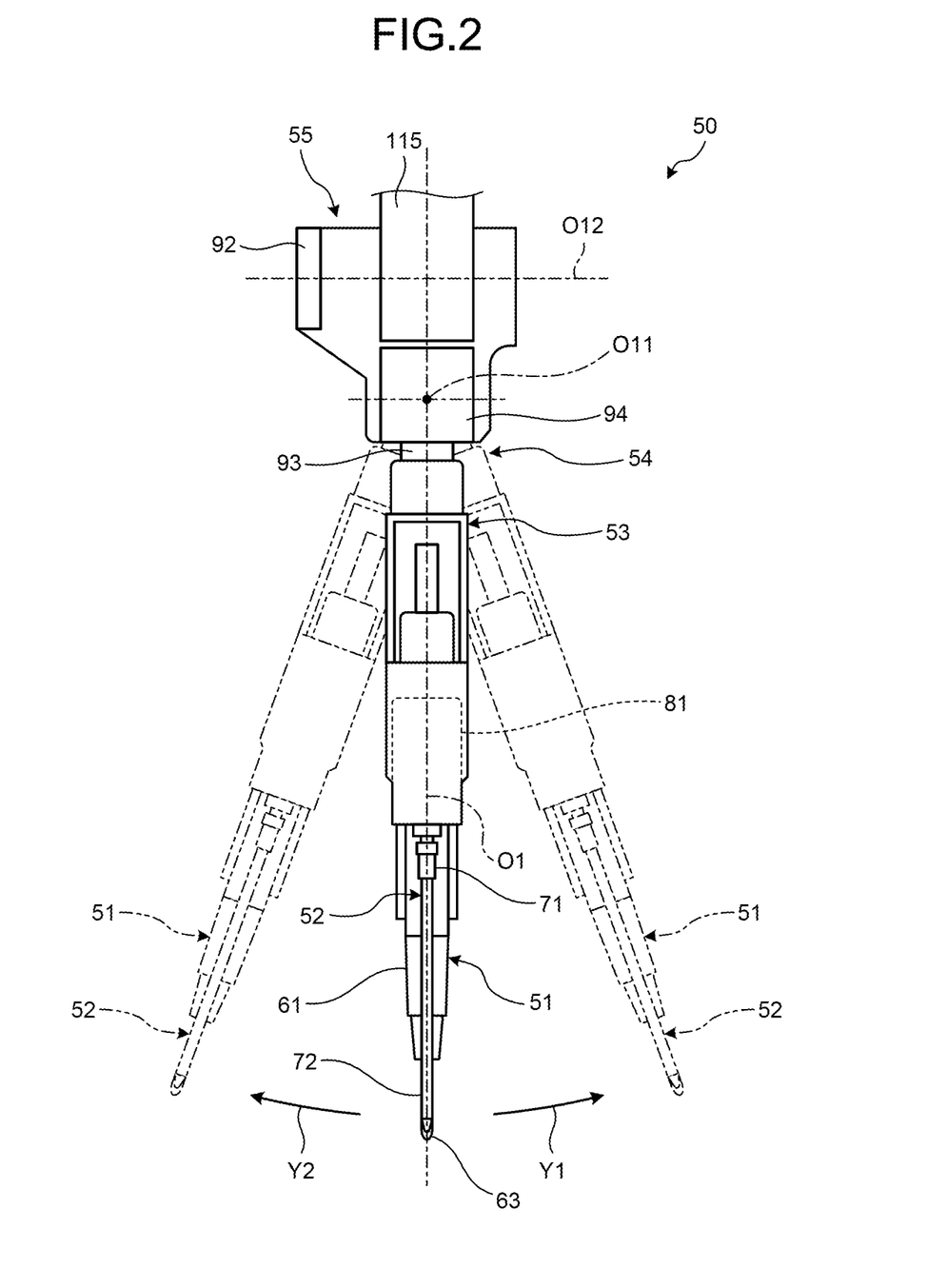
FIG. 2 is a side view illustrating the welding apparatus.
Figure 3:
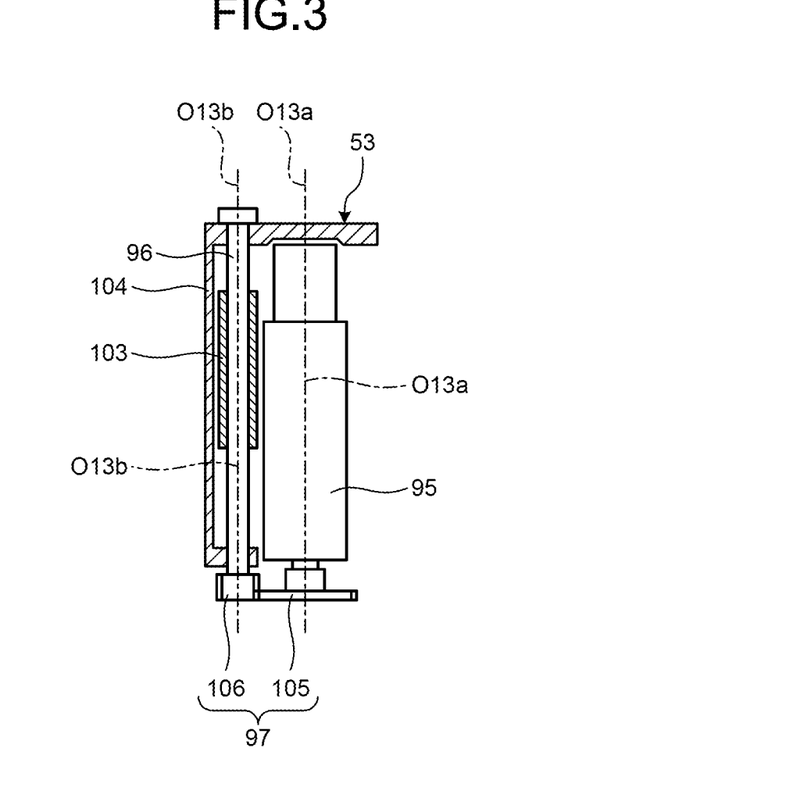
FIG. 3 is a sectional view along line III-III of FIG. 1.

FIG. 1 is a front view illustrating the welding apparatus, FIG. 2 is a side view illustrating the welding apparatus, and FIG. 3 is a sectional view along line III-III of FIG. 2.

In the present embodiment, as illustrated in FIGS. 1 to 3, a welding apparatus 50 includes a welding torch 51, a wire nozzle 52, a support stand 53, and a first support mechanism 54. The welding apparatus 50 further includes a second support mechanism 55 and a third support mechanism 56.

As illustrated in FIG. 9, the reactor vessel 11 includes the reactor vessel body 12 and the reactor vessel lid 13. The reactor vessel lid 13 has the control rod driving unit 29 disposed on the upper part thereof. Thus, the reactor vessel lid 13 has a plurality of nozzles 31 fixed thereto (see FIG. 7) that support the control rod cluster drive shafts 30 in the control rod driving unit 29 in a freely movable manner. The welding apparatus 50 of the present embodiment is an apparatus configured to fix the nozzle 31 to the reactor vessel lid 13 by welding.

As illustrated in FIGS. 1 to 3, the support stand 53 has the welding torch 51 disposed in the center thereof, the wire nozzle 52 on one side (right side in FIG. 1), and the third support mechanism 56 on the other side (left side in FIG. 1).

The welding torch 51 is disposed along an axial direction of a central axis O1. The welding torch 51 is configured so as to be able to perform arc welding, for example, TIG welding. The welding torch 51 includes a welding head 61, a welding nozzle 62, and a welding electrode 63. The welding head 61 is fixed to the support stand 53. The welding nozzle 62 is disposed axially through inside of the welding head 61. Inside of the welding nozzle 62 is filled with shielding gas. The welding electrode 63 is disposed inside the welding nozzle 62, and has a tip end (lower end in FIG. 1) protruding from the welding head 61. The welding electrode 63 contains tungsten and other elements.

The support stand 53 has a motor 64 for torch rotation fixed thereto, and a drive gear 65 is fixed to an output shaft. The welding nozzle 62 has a driven gear 66 fixed to the upper part thereof, and the drive gear 65 meshes with the driven gear 66. Thus, when the motor 64 for torch rotation is driven, a rotational force is transmitted to the welding nozzle 62 through the drive gear 65 and the driven gear 66. Then, the welding nozzle 62 rotates around the central axis O1, and the welding electrode 63 rotates around the central axis O1 and can therefore change its orientation.

The wire nozzle 52 is disposed along the axial direction of a central axis O2, which is parallel to the central axis O1. The wire nozzle 52 includes a wire feed tube 71 and a nozzle part 72. The wire feed tube 71 is disposed along the central axis O2, and the nozzle part 72 is curved toward the central axis O1 at the tip end (lower end in FIG. 1) thereof, with the tip end being near a tip end of the welding electrode 63. The wire nozzle 52 guides a welding wire W supplied from a wire reel (not illustrated) toward the welding electrode 63.

The support stand 53 supports an elevator 73 in a freely movable manner along the axial direction of the central axis O2. The elevator 73 supports the wire feed tube 71 in a freely rotatable manner around the central axis O2. The elevator 73 has a motor 74 for wire nozzle rotation fixed thereto, and a drive cam 75 with a convex part is fixed to the output shaft of the motor 74. On the other hand, the wire feed tube 71 has a driven cam 76 with a recess fixed to the lower part thereof, and the drive cam 75 engages in the driven cam 76. Thus, when the motor 74 for wire nozzle rotation is driven, a rotational force is transmitted to the wire feed tube 71 through the drive cam 75 and the driven cam 76. Then, the wire feed tube 71 rotates around the central axis O2, and the nozzle part 72 rotates around the central axis O2 and can therefore change its orientation.

The support stand 53 has a motor 77 for moving the wire nozzle fixed thereto along the axial direction of a central axis O3, which is parallel to the central axis O1, and a threaded shaft 73 is fixed to the output shaft of the motor 77. On the other hand, the elevator 73 has a nut 79 fixed to the upper part thereof, and the threaded shaft 78 screws into the nut 79 via balls (not illustrated). Thus, when the motor 77 for moving the wire nozzle is driven, a rotational force is converted into a linear moving force by the threaded shaft 78 and nut 79 and transmitted to the elevator 73. Then the elevator 73 moves along the central axis O2, and the wire nozzle 52 moves along and rotates around the central axis O2 and can therefore change its axial position.

The support stand 53 has an arc monitoring camera 81 and a mirror 82 disposed between the welding torch 51 and the wire nozzle 52. The arc monitoring camera 81 can capture weld images of the welding torch 51 and a tip end of the wire nozzle 52 through the mirror 82.

On a guide part 91, the second support mechanism 55 supports a second support member 92 in a freely rotatable manner. The second support mechanism 55 has a second support axis O12 along a direction that is orthogonal to a direction in which the welding torch 51 and the wire nozzle 52 are arranged and is orthogonal to the axial direction (central axis O1) of the welding torch 51. The second support mechanism 55 has a second motor (not illustrated). The second motor is fixed to the guide part 91 and the second support member 92 is connected to the output shaft of the second motor. Thus, when the second motor is driven, the second support member 92 can be rotated around the second support axis O12 with respect to the guide part 91. Rotating the second support member 92 around the second support axis O12 allows the welding torch 51 and wire nozzle 52 that are mounted on the support stand 53 to incline in X1 and X2 directions in FIG. 1.

On the second support member 92, the first support mechanism 54 supports a first support member 93 in a freely rotatable manner. The first support mechanism 54 has a first support axis O11 along a direction that is along the direction in which the welding torch 51 and the wire nozzle 52 are arranged and is orthogonal to the axial direction (central axis O1) of the welding torch 51. The first support mechanism 54 includes a first motor 94. The first motor 94 is fixed to the second support member 92, and the first support member 93 is connected to the output shaft of the first motor 94. Thus, when the first motor 94 drives, the first support member 93 can be rotated around the first support axis O11 with respect to the second support member 92. Rotating the first support member 93 around the first support axis O11 allows the welding torch 51 and wire nozzle 52 that are mounted on the support stand 53 to incline in Y1 and Y2 directions as illustrated in FIG. 2.

On the first support member 93, the support, stand 53 supports the third support mechanism 56 in a freely movable manner. The third support mechanism 56 is disposed between the first support mechanism 54 and the upper end of the support stand 53. The third support mechanism 56 has third support axes O13a, O13b along the axial direction (central axis O1) of the welding torch 51. The third support mechanism 56 includes a third motor 95, a threaded shaft 96, and a transmission mechanism 97. The third motor 95 is disposed along the axial direction of the welding torch 51. The threaded shaft 96 is disposed along the axial direction of the welding torch. The third motor 95 and the threaded shaft 96 are parallel to each other and are disposed adjacent to each other with a predetermined distance therebetween. The third motor 95 and the threaded shaft 96 are connected by a transmission mechanism 97, and the rotational force of the third motor 95 is transmitted to the threaded shaft 96 by the transmission mechanism 97.

That is, the first support member 93 has one end connected to the output shaft of the first motor 94, and the other end fixed to a slider 102 via a connecting member 101, the slider 102 having a nut part 103 provided therefor. On the other hand, the support stand 53 has a connecting part 104 integrally disposed on the other side thereof. The connecting part 104 has a box shape having one side (right side in FIG. 3) open. In the connecting part 104, the third motor 95 and the threaded shaft 96 are disposed with a predetermined distance and in parallel to each other. The third motor 95 is along the third support axis O13a and is fixed to the connecting part 104, and a drive gear 105 is fixed to the output shaft of the third motor 95 that extends downward. The threaded shaft 96 is along the third support axis O13b, and each end in the axial direction is supported by the connecting part 104 in a freely rotatable manner, and a driven gear 106 is fixed to the output shaft of the threaded shaft 96 extending downward. The drive gear 105 meshes with the driven gear 106, and the transmission mechanism 97 includes the drive gear 105 and the driven gear 106.

The connecting part 104 has a guide member 107 fixed to a side thereof. The guide member 107 is supported by the slider 102 in a freely movable manner along the direction of the third support axes O13a, O13b. Furthermore, the slider 102 has the threaded shaft 96 screwed into the nut part 103. The connecting part 104 includes a position detection unit 108 adjacent to the third motor 95. The position detection unit 108 has a driven gear 109 that meshes with the drive gear 105, and detects the number of rotations of the driven gear 109 linked to the drive gear 105 so as to detect a relative position of the nut part 103 and the threaded shaft 96.

Thus, when the third motor 95 is driven, the rotational force is transmitted to the threaded shaft 96 through the transmission mechanism 97 (drive gear 105 and driven gear 106). Then, the threaded shaft 96 rotates around the third support axis O13b, and the threaded shaft 96 and the nut part 103 into which the threaded shaft 96 is screwed move relative to each other in the direction of the third support axis O13b. Since the nut part 103 is provided on the slider 102 and the slider 102 is fixed to the first support member 93 via the connecting member 101, the support stand 53, on which the third support mechanism 56 (third motor 95, threaded shaft 96, and transmission mechanism 97) is supported, can move in the direction of the third support axes O13a, O13b with respective to the first support member 93.

The welding torch 51, the wire nozzle 52, the support stand 53, and the first support mechanism 54 are plane symmetric with respect to a plane along the first support axis O11 and the central axis O1 of the welding torch 51. In other words, in FIG. 2, the welding torch 51, the wire nozzle 52, the support stand 53, and the first support mechanism 54 are line symmetric with respect to the central axis O1.

[Overall Configuration of the Welding Apparatus]

Figure 4:
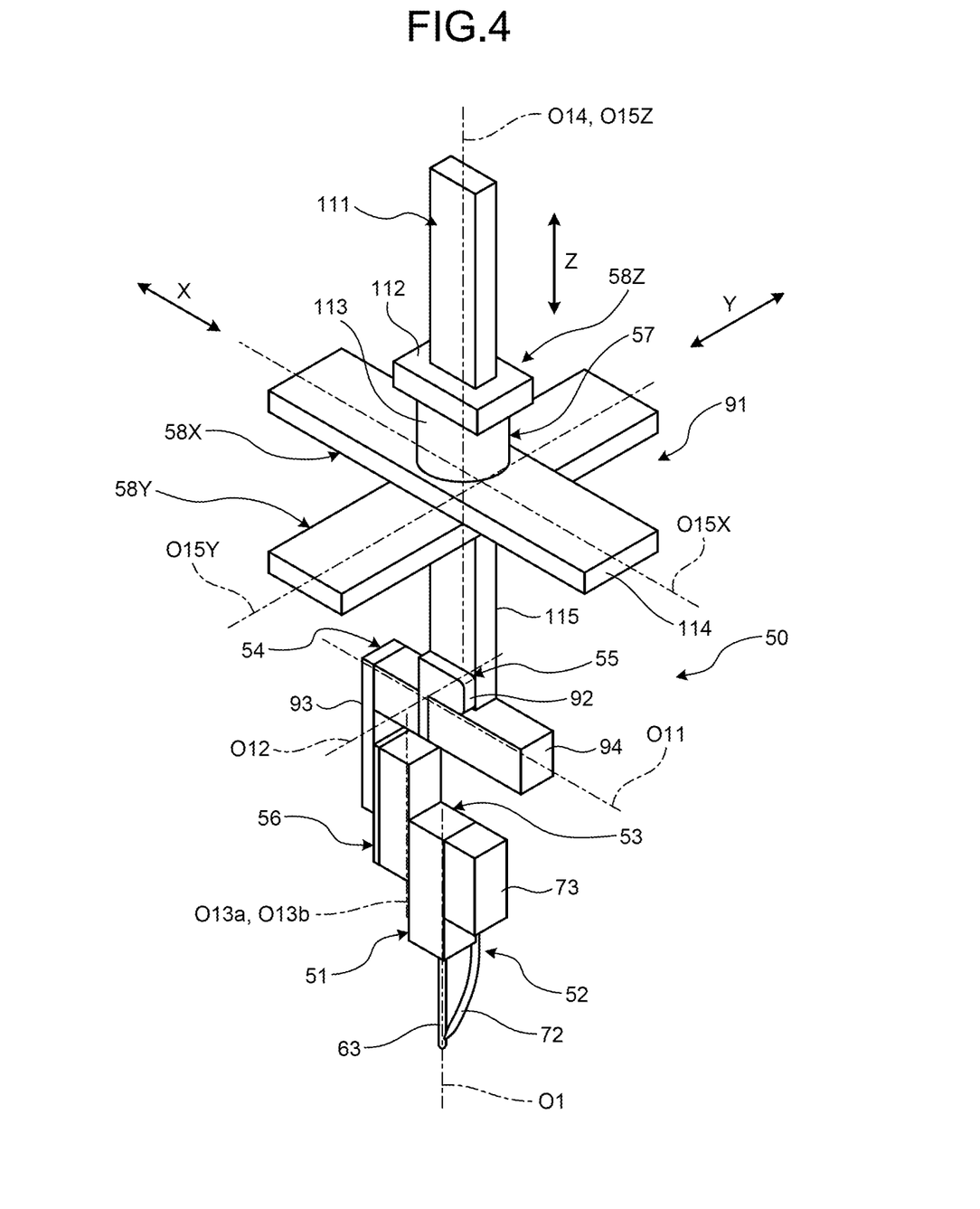
FIG. 4 is a schematic diagram illustrating an overall configuration of the welding apparatus.

FIG. 4 is a schematic diagram illustrating an overall configuration of the welding apparatus.

In the welding apparatus 50, as illustrated in FIG. 4, the guide part 91 includes a fourth support mechanism 57 and a fifth support mechanism 58. The support stand 53 is supported to be rotatable around the fourth support axis O14 along the vertical direction by the fourth support mechanism 57. The fifth support mechanism 58 can move the support stand 53 in the axial directions of the fifth support axes O15X, O15Y, O15Z along at least three orthogonal axial directions (X, Y, and Z directions). Here, the fourth support axis O14 and the fifth support axis O15Z are coaxial.

The welding apparatus 50 is supported on a tip end of an arm of a welding robot, which is not illustrated. The Z-direction support member 112 is along the axial direction of the fourth support axis O14 and is supported by the arm of the welding robot. A support arm ill is supported to be movable along the fourth support axis O14 and the fifth support axis O15Z with respect to the Z-direction support member 112 by a Z-axis support mechanism 58Z. The Z-axis support mechanism 53Z has a motor, which is not illustrated. A fourth support member 113 is supported to be rotatable around the fourth support axis O14 and the fifth support axis O15Z with respect to the support arm 111 by the fourth support mechanism 57. The fourth support mechanism 57 has a motor, which is not illustrated.

A X-direction support member 114 is supported to be movable along the fifth support axis O15X with respect to the fourth support member 113 by an X-axis support mechanism 58X. The X-axis support mechanism 58X has a motor, which is not illustrated. A Y-direction support member 115 is supported to be movable along the fifth support axis O15Y with respect to the X-direction support member 114 by a Y-axis support mechanism 58Y. The Y-axis support mechanism 58Y has a motor, which is not illustrated. On the lower end of the Y-direction support member 115, the second support mechanism 55 supports the second support member 92 in a freely rotatable manner. The fifth support mechanism 58 includes the X-axis support mechanism 58X, the Y-axis support mechanism 53Y, and the Z-axis support mechanism 53Z.

Thus, activating the fourth support mechanism 57 allows the welding torch 51 and the wire nozzle 52 that are mounted on the support stand 53 to rotate around the fourth support axis O14 (fifth support axis O15Z). Activating the fifth support mechanism 58 allows the welding torch 51 and wire nozzle 52 that are mounted on the support stand 53 to move in the three axial directions (X, Y, and Z directions) along the fifth support axes O15X, O15Y, O15Z.

[Control Configuration of the Welding Apparatus]

Figure 5:
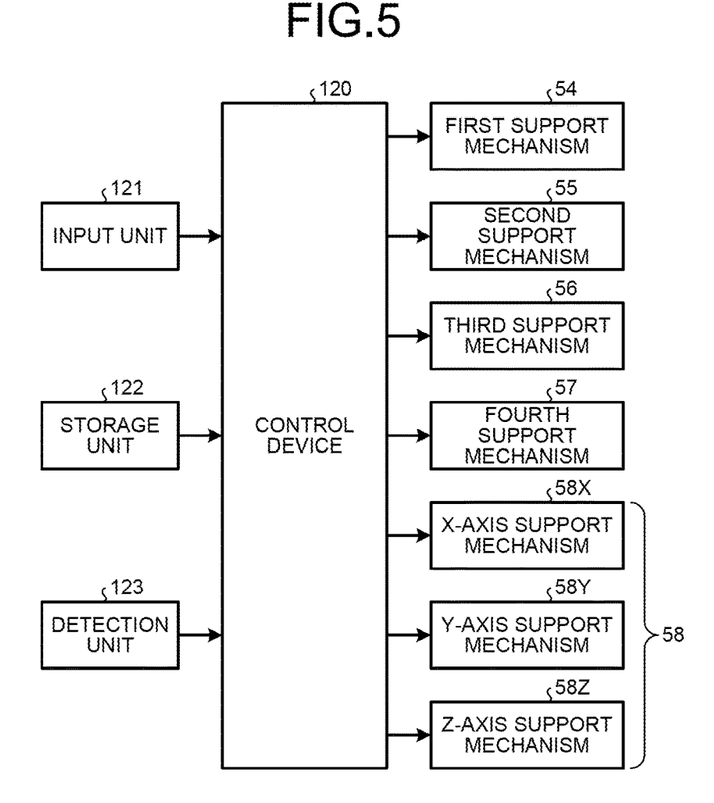
FIG. 5 is a control block of the welding apparatus.

FIG. 5 is a control block of the welding apparatus.

As illustrated in FIG. 5, a control device 120 is connected to an input unit 121, a storage unit 122, and a detection unit 123. The control device 120 is also connected to the first support mechanism 54, the second support mechanism 55, the third support mechanism 56, the fourth support mechanism 57, and the fifth support mechanism 58 (X-axis support mechanism 58X, Y-axis support mechanism 58Y, Z-axis support mechanism 58Z).

The input unit 121 is, for example, a keyboard, which allows an operator to input various kinds of welding information. The storage unit 122 is, for example, a memory, in which a computer program for implementing welding, and the like, are stored. The detection unit 123 detects a welding state by the welding apparatus 50. Here, the welding state is, for example, a distance from the welding electrode 63 or the nozzle part 72 to a welding surface, a welding current value, and a welding voltage value, and the like. The control device 120 controls operation of the first support mechanism 54, the second support mechanism 55, the third support mechanism 56, the fourth support mechanism 57, and the fifth support mechanism 58 based on information input from the input unit 121, information stored in the storage unit 122, and information detected by the detection unit 123.

In the present embodiment, the control device 120 independently controls the first support mechanism 54, the second support mechanism 55, the third support mechanism 56, the fourth support mechanism 57, and the fifth support mechanism 58. Accordingly, a position and a posture of the welding torch 51 and the wire nozzle 52 are controlled to an optimum position and an optimum posture.

[Welding Method Using the Welding Apparatus]

Figure 6:
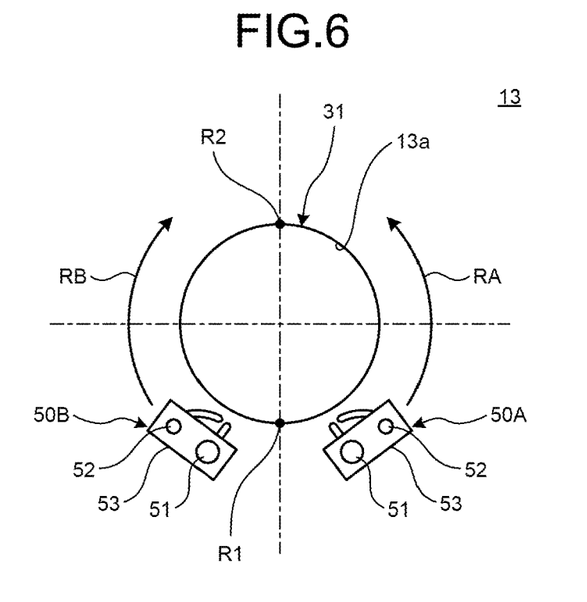
FIG. 6 is a plan view for explaining a welding method with the welding apparatus.
Figure 7:
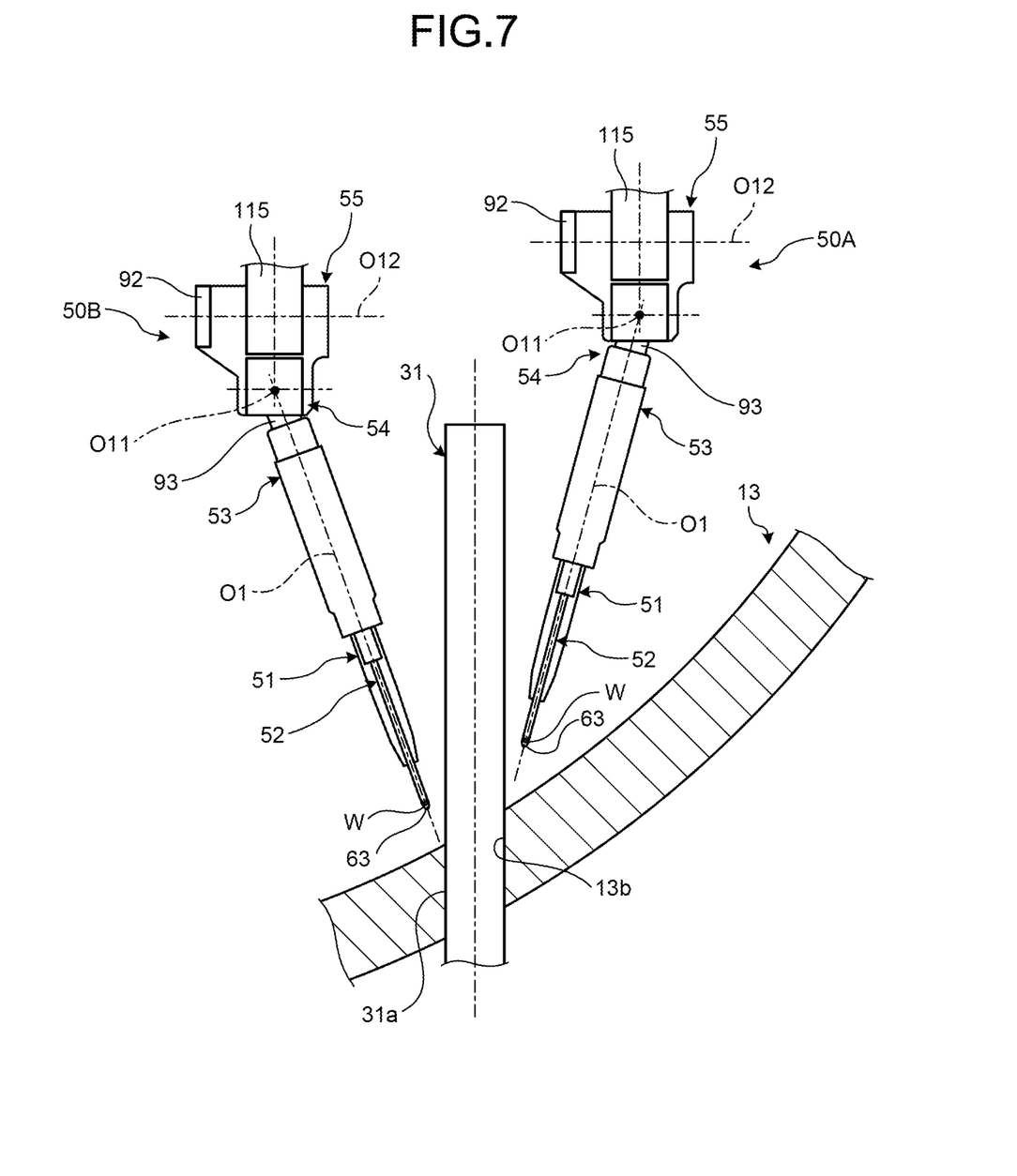
FIG. 7 is a schematic diagram for explaining an angle adjustment method of a welding torch with a first support mechanism.
Figure 8:
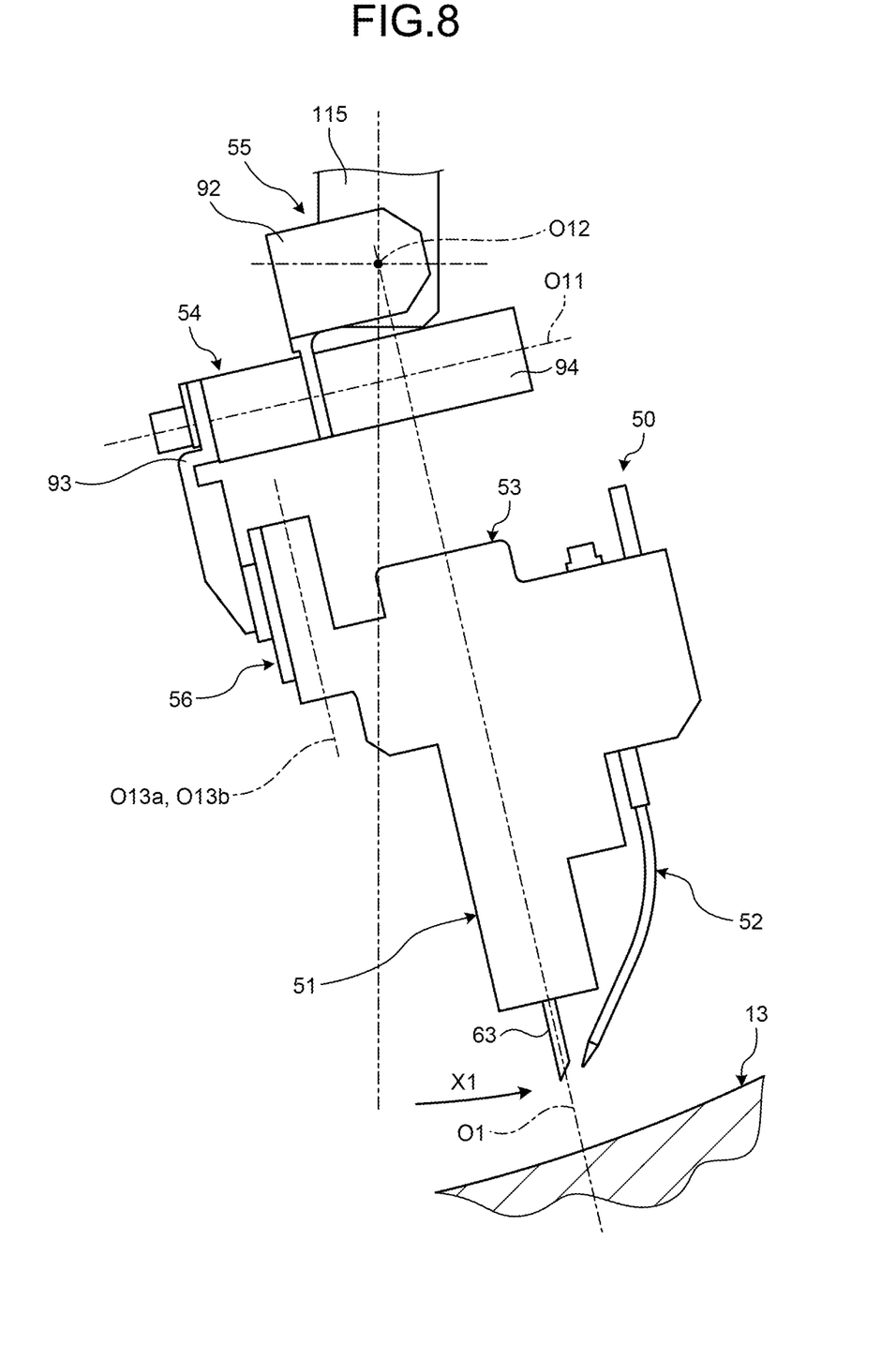
FIG. 8 is a schematic diagram for explaining the angle adjustment method of the welding torch with a second support mechanism.

FIG. 6 is a plan view for explaining the welding method using the welding apparatus, FIG. 7 is a schematic diagram for explaining the angle adjustment method of the welding torch with the first support mechanism, and FIG. 8 is a schematic diagram for explaining the angle adjustment method of the welding torch with the second support mechanism.

The welding method using the welding apparatus 50 of the present embodiment includes, as illustrated in FIG. 1, a step of performing welding by rotating the support stand 53 by a predetermined angle from a reference position to the one side around the first support axis O11 along the direction in which the welding torch 51 and the wire nozzle 52 are arranged, and a step of performing welding by moving the support stand 53 for a predetermined angle from the reference position to the other side around the first, support axis O11.

As illustrated in FIG. 6, the following describes work to weld the nozzle 31 to the reactor vessel lid 13 by the welding apparatus 50 of the present embodiment. The reactor vessel lid 13 has a through hole 13a at a predetermined position, and the nozzle 31 is inserted into the through hole 13a so as to be positioned. The reactor vessel lid 13 has a grooved portion on a side of an inner surface 13b in the through hole 13a (see FIG. 7). The welding apparatus 50 performs a grooving weld between the grooved portion of the inner surface 13b in the through hole 13a (see FIG. 7) and an outer surface 31a of the nozzle 31 (see FIG. 7).

When the grooving weld between the through hole 13a of the reactor vessel lid 13 and the outer surface 31a of the nozzle 31 is performed by the welding apparatus 50, first, welding is performed with the support stand 53, on which the welding torch 51 and wire nozzle 52 are mounted, moving half around the nozzle 31 from a start position R1 to an end position R2 through a welding path RA. Next, the support stand 53, on which the welding torch 51 and wire nozzle 52 are mounted, is returned to the start position R1, and welding is performed with the support stand 53 moving half around the nozzle 31 from the start position R1 to the end position R2 through a welding path RB.

When the welding apparatus 50 performs welding, the support stand 53, on which the welding torch 51 and wire nozzle 52 are mounted, moves in opposite moving directions between the welding through the welding path RA and the welding through the welding path RB, with respect to the nozzle 31. In other words, in FIG. 6, the moving direction of the welding path RA is counterclockwise, and the moving direction of the welding path RB is clockwise. The inner surface 13b of the reactor vessel lid 13 has an arc shape, and the nozzle 31 is positioned along the vertical direction. Thus, the welding apparatus 50 needs to perform welding with the support stand 53 tilted by a predetermined angle around the first support axis O11 by the first support mechanism 54 so that the welding torch 51 and the wire nozzle 52 mounted on the support stand 53 do not come into contact with the nozzle 31. Furthermore, when the support stand 53 moves in the welding paths RA and RB, the wire nozzle 52 needs to precede the welding torch 51.

First, the welding apparatus 50 moves the support stand 53, on which the welding torch 51 and wire nozzle 52 are mounted, along the welding path RA to perform welding. As illustrated in FIGS. 6 and 7, first, the first support mechanism 54 rotates the support stand 53 around the first support axis O11. Then, the welding torch 51 and wire nozzle 52 together with the support stand 53 are tilted by a predetermined angle from the reference position along the vertical direction, so as to be in a state represented as a welding apparatus 50A in FIG. 7.

Next, the support stand 53 is rotated around the fourth support axis O14 (see FIG. 4 for all) by the fourth support mechanism 57 and moved in the directions of the fifth support axes O15X, O15Y, O15Z (see FIG. 4 for all) by the fifth support mechanism 58. Then, the welding torch 51 and the wire nozzle 52 are positioned at the start position R1 and the support stand 53 is made along the welding path RA. At this time, the wire nozzle 52 is made closer to the front side in the movement direction than the welding torch 51 is.

In this state, operating and controlling the fourth support mechanism 57 and the fifth support mechanism 58 (see FIG. 4 for all) allows the support stand 53 to move along the welding path RA to weld the reactor vessel lid 13 and the nozzle 31. At this time, the third support mechanism 56 is operated and controlled based on the detection results of the detection unit 123. In other words, the third support mechanism 56 moves the support stand 53 along the axial direction of the third support axis O13 to adjust the positions of the welding torch 51 and the wire nozzle 52 so that the distance between the tip end of the welding electrode 63 of the welding torch 51 and the welding position can be maintained at a proper position.

As the tilt angle of the inner surface 13*b* of the reactor vessel lid 13 changes, the tilt angle of the welding torch 51 and the wire nozzle 52 together with the support stand 53 is adjusted by operating and controlling the first support mechanism 54. Furthermore, as illustrated in FIG. 8, it is desirable that the welding electrode 63 of the welding torch 51 be positioned in a direction of being orthogonal to the welding surface between the outer surface 31*a* of the nozzle 31 and the inner surface 13*b* of the reactor vessel lid 13, as much as possible. Thus, the second support mechanism 55 rotates the support stand 53 around the second support axis O12. Then, the welding torch 51 and wire nozzle 52 together with the support stand 53 are tilted by a predetermined angle, for example, in the inclined direction X1.

As illustrated in FIGS. 6 and 7, when the welding torch 51 and the wire nozzle 52 move from the start position R1 through the welding path RA to the end position R2 and complete the welding of the reactor vessel lid 13 and the nozzle 31 by half the circumference of the nozzle 31, the welding apparatus 50 then moves the support stand 53, on which the welding torch 51 and the wire nozzle 52 are mounted, along the welding path RB to perform welding. First, the first support mechanism 54 rotates the support stand 53 around the first support axis O11. Then, the welding torch 51 and the wire nozzle 52 together with the support stand 53 are tilted by a predetermined angle from the reference position along the vertical direction, so as to be in a state represented as a welding apparatus S0B in FIG. 7.

Next, the support stand 53 is rotated around the fourth support axis O14 (see FIG. 4 for all) by the fourth support mechanism 57 and moved in the directions of the fifth support axes O15X, O15Y, O15Z (see FIG. 4 for all) by the fifth support mechanism 58. Then, the welding torch 51 and the wire nozzle 52 are positioned at the start position R1 and the support stand 53 is made along the welding path RB. At this time, the wire nozzle 52 is made closer to the front side in the movement direction than the welding torch 51 is.

In this state, operating and controlling the fourth support mechanism 57 and the fifth support mechanism 58 (see FIG. 4 for all) allows the support stand 53 to move along the welding path RB to weld the reactor vessel lid 13 and the nozzle 31. At this time, the third support mechanism 56 is operated and controlled based on the detection results of the detection unit 123. In other words, the third support mechanism 56 moves the support stand 53 along the axial direction of the third support axis O13 to adjust the positions of the welding torch 51 and the wire nozzle 52 so that the distance between the tip end of the welding electrode 63 of the welding torch 51 and the welding position can be maintained at the proper position.

In this way, the welding apparatus 50 of the present embodiment first moves the welding torch 51 and the wire nozzle 52 half around the nozzle 31 along the welding path FA to perform welding. Next, the welding apparatus 50 moves the welding torch 51 and the wire nozzle 52 half around the nozzle 31 along the welding path RB to perform welding. As a result, the reactor vessel lid 13 and the nozzle 31 are welded all around the circumference.

Effect of the Present Embodiment

A welding apparatus according to a first aspect includes a welding torch 51, a wire nozzle 52, a support stand 53 that supports the welding torch 51 and the wire nozzle 52 with a predetermined distance therebetween, and a first support mechanism 54 that supports the support stand 53 in a rotatable manner around the first support axis O11 that is along the direction in which the welding torch 51 and the wire nozzle 52 are arranged.

The welding apparatus according to the first aspect allows the first support mechanism 54 to rotate the support stand 53, on which the welding torch 51 and the wire nozzle 52 are supported, around the first support axis O11. For example, when carrying out welding work to fix the nozzle 31 to the reactor vessel lid 13, it is possible to adjust the angle of the welding torch 51 and the wire nozzle 52 with respect to the welding surface between the reactor vessel lid 13 and the nozzle 31 so that the welding torch 51 and the wire nozzle 52 do not come into contact with the nozzle 31. As a result, it is possible to change the movement directions of the welding torch 51 and wire nozzle 52 without using a conventional wire nozzle reversing mechanism, and thereby the apparatus can be miniaturized. In the operation of the direction change, the amount of movement of the route of the welding wire W to be supplied from the upstream of the wire nozzle 52 along the central axis O2 is small, thereby suppressing fluctuations in a wire supply position from the nozzle part 72 caused by bending of the welding wire W, leading to stable supply of the welding wire W.

A welding apparatus according to a second aspect arranges the first support axis O11 in a direction of being orthogonal to the axial direction of the welding torch 51. Thus, the support stand 53 is supported to be rotatable around the first support axis O11 that is along the direction in which the welding torch 51 and the wire nozzle 52 are arranged and is also along the direction orthogonal to the axial direction of the welding torch 51, so that the welding torch 51 and the wire nozzle 52 can be adjusted to any desired angle.

A welding apparatus according to a third aspect includes a second support mechanism 55 that supports the first support mechanism 54 so that the support stand 53 rotates around the second support axis O12 that is orthogonal to the first support axis O11 and is along the direction of being orthogonal to the axial direction of the welding torch 51. Thus, the second support mechanism 55 allows the first support mechanism 54 to rotate around the second support axis O12 that is orthogonal to the first support axis O11, so that the support stand 53 can be rotated, and the welding torch 51 can be properly adjusted to a desired angle even if the welding surface fluctuates.

A welding apparatus according to a fourth aspect includes the third support mechanism 56 that supports the support stand 53 so that the support stand 53 is movable in the axial direction of the third support axis O13 that is along the axial direction of the welding torch 51. Thus, the third support mechanism 56 allows the support stand 53 to move along the third support axis O13 that is along the axial direction of the welding torch 51, so that the welding torch 51 can be properly adjusted to a desired position even if the welding surface fluctuates.

A welding apparatus according to a fifth aspect has the third support mechanism 56 to be disposed between the first support mechanism 54 and the upper end of the support stand 53. This configuration prevents the third support mechanism 56 from coming into contact with a welding object, thereby providing stable welding work.

A welding apparatus according to a sixth aspect includes, as the third support mechanism 56, the third motor 95 disposed along the axial direction of the welding torch 51, the threaded shaft 96 disposed along the axial direction of the welding torch 51 and adjacent to the third motor 95, and the transmission mechanism 97 configured to transmit the rotational force of the third motor 95 to the threaded shaft 96. Thus, disposing the third motor 95 and the threaded shaft 96 in parallel and adjacent to each other can downsize the third support mechanism 56 and prevents the third support mechanism 56 from coming into contact with the welding object, thereby providing stable welding work. This third support mechanism 56 may be of an arc voltage control (AVC). With this configuration, the third support mechanism 56 can automatically perform adjustment.

In a welding apparatus according to a seventh aspect, the fourth support mechanism 57 that supports the support stand 53 so that the support stand 53 is rotatable around the fourth support axis O14 that is along the axial direction of the welding torch 51 is provided to the guide part 91. This allows the fourth support mechanism 57 to rotate the support stand 53 around the fourth support axis O14, so that the orientations of the welding torch 51 and the wire nozzle 52 can be properly adjusted.

In a welding apparatus according to an eighth aspect, the fifth support mechanism 58 that is capable of moving the support stand 53 in at least the three orthogonal axial directions is provided to the guide part 91. This allows the fifth support mechanism 58 to move the support stand 53 along the axial directions of the fifth support axes O15X, O15Y, O15Z, so that the positions of the welding torch 51 and the wire nozzle 52 can be adjusted properly.

In a welding apparatus according to a ninth aspect, the welding torch 51, the wire nozzle 52, the support stand 53 and the first support mechanism 54 are plane symmetric with respect to the plane along the axial direction of the first support axis O11 and the axial direction of the welding torch 51. This configuration simplifies the structure.

A welding apparatus according to a tenth aspect includes the control device 120 configured to independently control the first support mechanism 54 and the second support mechanism 55. Thus, the control device 120 independently controlling the first support mechanism 54 and the second support mechanism 55 can move the welding torch 51 and the wire nozzle 52 to the optimum angle and the optimum position, thereby providing stable welding work.

A welding method according to an eleventh aspect includes a step of performing welding by rotating the support stand 53 by a predetermined angle from a reference position to one side around the first support axis O11 along the direction in which the welding torch 51 and the wire nozzle 52 are arranged, and a step of performing welding by moving the support stand 53 for a predetermined angle from the reference position to the other side around the first support axis oil. With this configuration, for example, when carrying out welding work to fix the nozzle 31 to the reactor vessel lid 13, it is possible to adjust the angle of the welding torch 51 and the wire nozzle 52 with respect to the welding surface between the reactor vessel lid 13 and the nozzle 31 so that the welding torch 51 and the wire nozzle 52 do not come into contact with the nozzle 31. As a result, it is possible to change the movement directions of the welding torch 51 and wire nozzle 52 without using a conventional wire nozzle reversing mechanism, and thereby the apparatus can be miniaturized. This also helps to prevent bending of the welding wire W.

In the embodiment described above, the second support mechanism 55, the first support mechanism 54, and the third support mechanism 56 are disposed from above in the vertical direction, but are not limited to this positional relation. For example, the first support mechanism 54 and the second support mechanism 55 may be reversed, or the third support mechanism 56 may be disposed at the topmost side.

In the above-described embodiment, the welding apparatus 50 is an apparatus that welds the nozzle 31 to the reactor vessel lid 13, but is not limited to this work and is suitable for use in narrow space areas.

In the above-described embodiments, adjusting a length of the welding torch 51 allows each of the support mechanisms 54, 55, 56 to be disposed in a position of being free from interference with a welding object, and makes it possible to properly perform welding in a narrow area.

REFERENCE SIGNS LIST

10 Pressurized water reactor
11 Reactor vessel
12 Reactor vessel body
13 Reactor vessel lid
25 Reactor core
26 Fuel assembly
27 Control rod
29 Control rod driving unit
30 Control rod cluster drive shaft
31 Nozzle stand
50 Welding apparatus
51 Welding torch
52 Wire nozzle
53 Support stand
54 First support mechanism
55 Second support mechanism
56 Third support mechanism
57 Fourth support mechanism
58 Fifth support mechanism
58X X-axis support mechanism
58Y Y-axis support mechanism
58Z Z-axis support mechanism
61 Welding head
62 Welding nozzle
63 Welding electrode
64 Motor for torch rotation
65 Drive gear
66 Driven gear
71 Wire feed tube
72 Nozzle part
73 Elevator
74 Motor for wire nozzle rotation
75 Drive cam
76 Driven cam
77 Motor for moving wire nozzle
78 Threaded shaft
79 Nut
81 Arc monitoring camera
82 Mirror
91 Guide part
92 Second support member
93 First support member
94 First motor
95 Third motor
96 Threaded shaft
97 Transmission mechanism
101 Connecting member
102 Slider
103 Nut part
104 Connecting part
105 Drive gear 106 Driven gear
107 Guide member
108 Position detection unit
109 Driven gear
111 Support arm
112 Z-direction support member
113 Fourth support member
114 X-direction support member
115 Y-direction support member
120 Control device
121 Input unit
122 Storage unit
123 Detection unit
O1, O2, O3 Central axis
O11 First support axis
O12 Second support axis
O13a, O13b Third support axis
O14 Fourth support axis
O15X, O15Y, O15Z Fifth support axis

The invention claimed is:

1. A welding apparatus, comprising:
a welding torch;
a wire nozzle to be placed near the tip of the welding torch;
a support stand that supports the welding torch and the wire nozzle with a predetermined interval therebetween and the relative position between the welding torch and the wire nozzle is fixed;
a first support mechanism that supports the support stand so that the support stand is rotatable around a first support axis that is along a direction in which the welding torch and the wire nozzle are arranged; and
a second support mechanism that rotatably supports the first support mechanism so that the support stand rotates around a second support axis that is orthogonal to the first support axis and is along a direction orthogonal to an axial direction of the welding torch.

2. The welding apparatus according to claim 1, wherein the first support axis is disposed along a direction orthogonal to an axial direction of the welding torch.

3. The welding apparatus according to claim 1, comprising a third support mechanism that supports the support stand so that the support stand is movable in an axial direction of a third support axis that is along an axial direction of the welding torch.

4. The welding apparatus according to claim 3, wherein the third support mechanism is disposed between the first support mechanism and an upper end of the support stand.

5. The welding apparatus according to claim 4, wherein the third support mechanism includes a motor disposed along an axial direction of the welding torch, a threaded shaft disposed along the axial direction of the welding torch and adjacent to the motor, and a transmission mechanism that transmits a rotational force of the motor to the threaded shaft.

6. The welding apparatus according to claim 1, comprising a fourth support mechanism that supports the support stand so that the support stand is rotatable around a fourth support axis along an axial direction of the welding torch, the fourth support mechanism being provided in a guide part.

7. The welding apparatus according to claim 6, comprising a fifth support mechanism that moves the support stand in at least three orthogonal axial directions, the fifth support mechanism being provided in the guide part.

8. The welding apparatus according to claim 1, wherein the welding torch, the wire nozzle, the support stand, and the first support mechanism are plane symmetric with respect to a plane along an axial direction of the first support axis and an axial direction of the welding torch.

9. The welding apparatus according to claim 1, comprising a control device that controls the first support mechanism and the second support mechanism, independently.

* * * * *